(12) United States Patent
Ookubo et al.

(10) Patent No.: US 11,954,459 B2
(45) Date of Patent: Apr. 9, 2024

(54) PROGRAM EDITING DEVICE OF PROGRAM PATH FOR WIRE ELECTRODE AND WIRE ELECTRICAL DISCHARGE MACHINE THEREOF

(71) Applicant: FANUC CORPORATION, Yamanashi (JP)

(72) Inventors: Kousuke Ookubo, Yamanashi-ken (JP); Ryo Nishikawa, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 706 days.

(21) Appl. No.: 17/108,982

(22) Filed: Dec. 1, 2020

(65) Prior Publication Data

US 2021/0173619 A1   Jun. 10, 2021

(30) Foreign Application Priority Data

Dec. 6, 2019 (JP) ................. 2019-221331

(51) Int. Cl.
*G06F 8/30* (2018.01)
*B23H 1/00* (2006.01)
*G05B 19/402* (2006.01)

(52) U.S. Cl.
CPC ............. *G06F 8/30* (2013.01); *G05B 19/402* (2013.01); *B23H 1/00* (2013.01); *G05B 2219/36342* (2013.01)

(58) Field of Classification Search
CPC .............. G06F 8/30; G05B 19/402; G05B 2219/36342; G05B 19/40937; G05B 2219/32161; G05B 2219/45221; B23H 1/00; B23H 7/06; B23H 7/20; B23H 7/02; B23H 7/30; B23H 2400/00; B23H 2600/10; Y02P 90/02
See application file for complete search history.

(56) References Cited

U.S. PATENT DOCUMENTS 9,796,034 B2 * 10/2017 Irie .................... B23H 9/00
2004/0011767 A1    1/2004 Hattori et al.
(Continued)

FOREIGN PATENT DOCUMENTS

| JP | H01127226 A | 5/1989 |
| JP | H05250024 A | 9/1993 |
| JP | H07256518 A | 10/1995 |

(Continued)

*Primary Examiner* — John P. Dulka
(74) *Attorney, Agent, or Firm* — Robert P. Michal, Esq.; Carter, DeLuca & Farrell LLP

(57) ABSTRACT

A program editing device edits a machining program in which a machining path along which a wire electrode of a wire electrical discharge machine machines a workpiece is defined. The machining program includes a plurality of blocks corresponding to respective multiple partial paths into which the machining path is divided, each of the blocks including path information indicating the corresponding partial path. The program editing device includes an analyzer analyzing the machining program and thereby identifying a predetermined shape pattern formed by a series of the multiple partial paths in the machining path, an information generator generating shape information corresponding to the identified predetermined shape pattern, and an editor inserting the shape information into the machining program.

6 Claims, 11 Drawing Sheets

(56) References Cited

U.S. PATENT DOCUMENTS

2013/0238114 A1\* 9/2013 Hiraga ................... G05B 19/19
                                                            700/193
2016/0346853 A1\* 12/2016 Tuboguchi ......... G05B 19/4093

FOREIGN PATENT DOCUMENTS

| JP | 2010099824 A | 5/2010 |
| JP | 2015123544 A | 7/2015 |
| JP | 2015207095 A | 11/2015 |
| JP | 2018-024085 A | 2/2018 |
| WO | WO 03/045614 A1 | 6/2003 |

\* cited by examiner

FIG. 5

```
Oxxxx ;
    :
    :
62A ──── Y12.0138 ;
62B ──── G0.2X-1.1009Y12.7854I3. ;
62C ──── G03X1.9594Y10.0314511.3017J-1.5183 ;
62D ──── X5.7535Y9.6469I1.9903J0.1964 ;
         G40Y3. ;
    :
    :
```

56

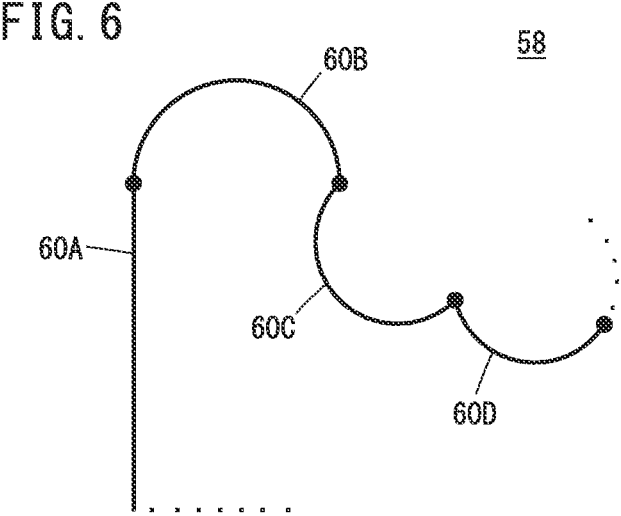

PROGRAM EDITING DEVICE OF PROGRAM PATH FOR WIRE ELECTRODE AND WIRE ELECTRICAL DISCHARGE MACHINE THEREOF

CROSS-REFERENCE TO RELATED APPLICATION

This application is based upon and claims the benefit of priority from Japanese Patent Application No. 2019-221331 filed on Dec. 6, 2019, the contents of which are incorporated herein by reference.

BACKGROUND OF THE INVENTION

Field of the Invention

The present invention relates to a program editing device and a wire electrical discharge machine. In particular, the present invention relates to a program editing device that edits a machining program in which a machining path of a wire electrode on a workpiece is defined, and a wire electrical discharge machine that relatively moves the wire electrode based on the machining program.

Description of the Related Art

Japanese Laid-Open Patent Publication No. 2018-024085 discloses a configuration of a wire electrical discharge machine in which a machining path of movement of a wire electrode relative to a workpiece is divided into a plurality of partial paths (sections or path segments), for which different processing conditions can be set.

SUMMARY OF THE INVENTION

In electrical discharge machining with a wire electrical discharge machine, the more complicated a machining path set in the machining program, the more likely the shape of the obtained machined product is to be different from the machining path. Some examples of complicated machining paths include a machining path that is composed of a series of angled corners and intricately designed, and a machining path that creates a pseudo-curve consisting of a series of straight line segments.

It is therefore an object of the present invention to provide a program editing device and a wire electrical discharge machine capable of improving the accuracy of electrical discharge machining.

One aspect of the present invention resides in a program editing device for editing a machining program in which a machining path along which a wire electrode of a wire electrical discharge machine machines a workpiece is defined, wherein the machining program includes a plurality of blocks corresponding to respective multiple partial paths into which the machining path is divided, each of the blocks including path information indicating the corresponding partial path, the program editing device including: an analyzer configured to analyze the machining program and thereby identify a predetermined shape pattern formed by a series of the multiple partial paths in the machining path; an information generator configured to generate shape information corresponding to the identified predetermined shape pattern, and an editor configured to insert the shape information into the machining program.

Another aspect of the present invention resides in a wire electrical discharge machine including a wire electrode and configured to move the wire electrode relative to a workpiece along a machining path defined in a machining program, including: a program editing device according to the above aspect of the invention; and an electrical discharge machining unit configured to move the wire electrode relative to the workpiece, along the machining path defined in the machining program edited by the program editing device and perform electrical discharge machining on the workpiece while compensating the machining conditions based on the shape information inserted into the machining program.

According to the aspects of the present invention, it is possible to provide a program editing device and a wire electrical discharge machine capable of improving the accuracy of electrical discharge machining.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a diagram showing an example of a state of a machining program before editing;

FIG. 6 is a diagram showing a machining path defined by the machining program of FIG. 5;

DESCRIPTION OF THE PREFERRED EMBODIMENTS

A program editing device and a wire electrical discharge machine of the present invention will be detailed below by describing a preferred embodiment with reference to the accompanying drawings.

Embodiment

Figure 1:
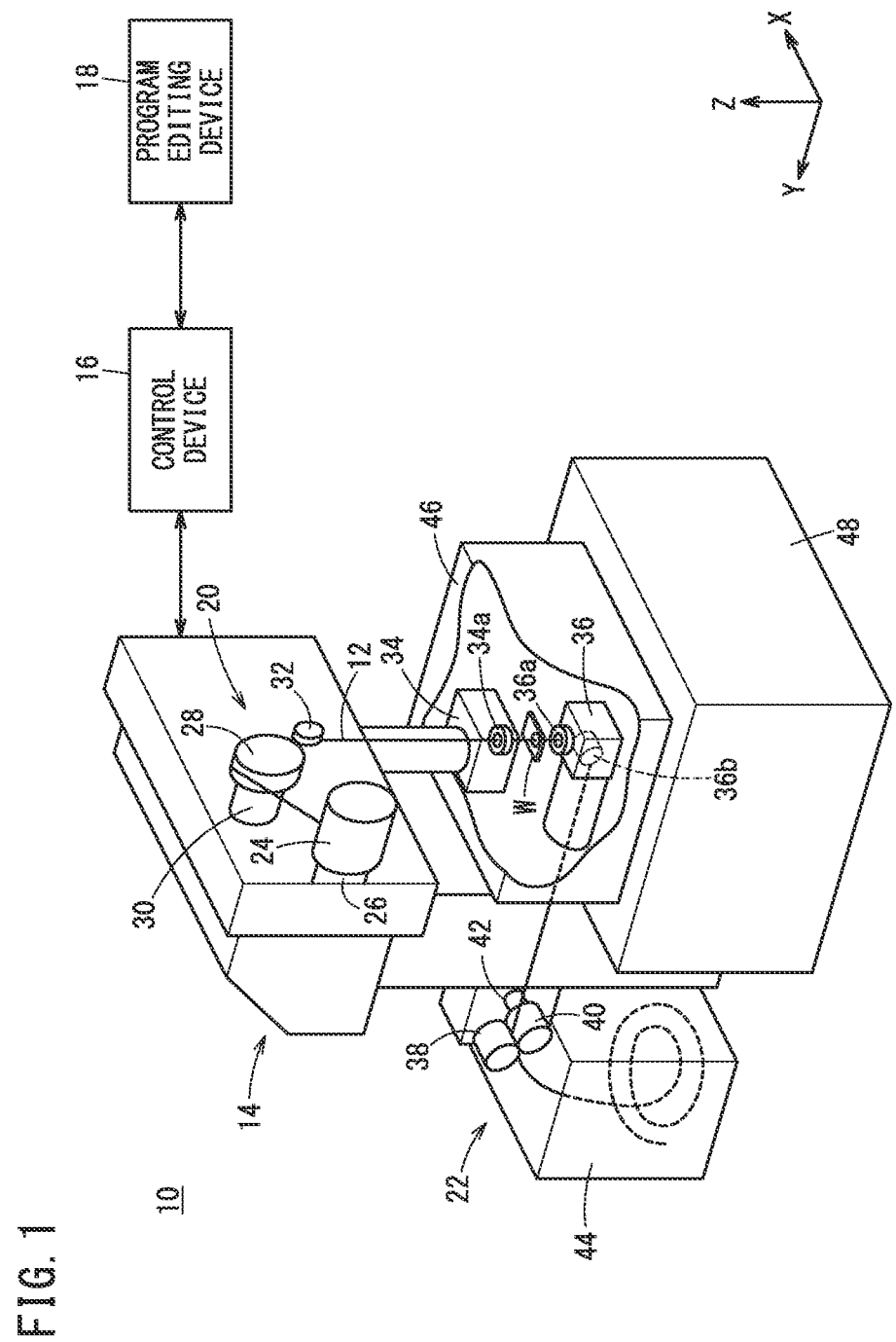
FIG. 1 is a schematic diagram showing a configuration of a wire electrical discharge machine of an embodiment of the present invention.

FIG. 1 is a schematic diagram showing a configuration of a wire electrical discharge machine 10 of the embodiment.

Referring first to FIG. 1, the overall configuration of the wire electrical discharge machine 10 will be described. FIG. 1 shows a coordinate system having an X-axis, a Y-axis, and a Z-axis which is set in the wire electrical discharge machine 10. The directions of X and Y axes are orthogonal to each other in a plane, and the Z-axis is orthogonal to each of the X and Y axes.

The wire electrical discharge machine 10 includes a wire electrode 12, a machine main body 14, a control device 16, and a program editing device 18. The wire electrical discharge machine 10 is a machine tool that machines a workpiece W by generating electrical discharge by applying voltage to the electrode gap between the workpiece W and the wire electrode 12 in a dielectric working fluid.

The wire electrode 12 is formed of, for example, metal material such as tungsten-based, copper alloy-based, or brass-based material. On the other hand, the workpiece W is formed of, for example, metal material such as iron-based material or superhard material (tungsten carbide).

The machine main body 14 includes a supply system 20 that supplies the wire electrode 12 toward the workpiece W, and a collecting system 22 that collects the wire electrode 12 having passed through the workpiece W.

The supply system 20 includes a wire bobbin 24, a torque motor 26, a brake shoe 28, a brake motor 30, a tension detector 32, and a die guide (upper die guide) 34. Of these, the wire bobbin 24 has a fresh wire electrode 12 wound thereon. The torque motor 26 applies torque to the wire bobbin 24. The brake shoe 28 applies a braking force to the wire electrode 12 by friction. The brake motor 30 applies brake torque to the brake shoes 28. The tension detector 32 detects the magnitude of the tension of the wire electrode 12. The die guide 34 guides the wire electrode 12 above the workpiece W.

The collecting system 22 includes a die guide (lower die guide) 36, a pinch roller 38, a feed roller 40, a torque motor 42, and a collecting box 44. Of these, the die guide 36 guides the wire electrode 12 below the workpiece W. The pinch roller 38 and the feed roller 40 hold the wire electrode 12 therebetween. The torque motor 42 applies torque to the feed roller 40. The collecting box 44 collects the wire electrode 12 conveyed by the pinch roller 38 and the feed roller 40.

The machine main body 14 includes a work-pan 46 capable of storing a dielectric working fluid such as deionized water or oil, which is used during machining. The work-pan 46 is placed on a base 48. The die guides 34 and 36 are disposed inside the work-pan 46, and the workpiece W is placed between the die guides 34 and 36. The die guides 34 and 36 and the workpiece W are immersed in the working fluid stored in the work-pan 46.

The die guide 34 has a support portion 34a, and the die guide 36 has a support portion 36a. The support portion 34a and the support portion 36a support the wire electrode 12. Further, the die guide 36 includes a guide roller 36b. The guide roller 36b changes the running direction of the wire electrode 12 and then guides the wire electrode 12 to the pinch roller 38 and the feed roller 40.

The die guide 34 ejects a sludge-free clean working fluid toward the electrode gap formed between the wire electrode 12 and the workpiece W. Thus, the electrode gap is filled with the clean liquid suitable for machining, and as a result, reduction in machining accuracy due to sludge generated during machining is prevented. Not only the die guide 34, but also the die guide 36 may also eject a clean working fluid toward the electrode gap.

Figure 2:
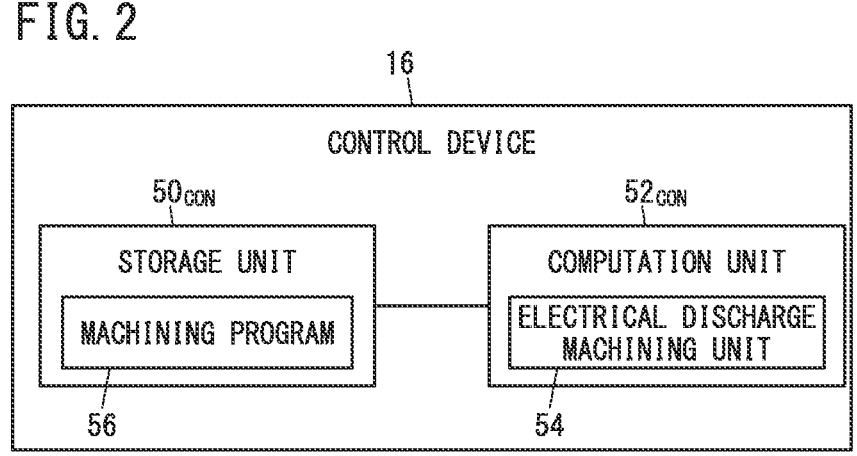
FIG. 2 is a schematic diagram showing a configuration of a control device.

FIG. 2 is a schematic diagram showing the configuration of the control device 16.

The control device 16 controls the machine main body 14 according to a machining program 56 and machining conditions. The control device 16 includes a storage unit $50_{CON}$ and a computation unit $52_{CON}$.

The storage unit $50_{CON}$ stores information, and includes, for example, a hard disk. The storage unit $50_{CON}$ stores therein the machining program 56 and machining conditions. In addition, control software for executing electrical discharge machining is stored.

The computation unit $52_{CON}$ processes information, and includes hardware such as a CPU (Central Processing Unit) or a GPU (Graphics Processing Unit), for example. The computation unit $52_{CON}$ includes an electrical discharge machining unit 54. The electrical discharge machining unit 54 is realized by the computation unit $52_{CON}$ implementing the control software in cooperation with the storage unit $50_{CON}$. The electrical discharge machining unit 54 performs electrical discharge machining on the workpiece W by relatively moving the wire electrode 12 along a machining path 58 set in the machining program 56, based on the machining conditions.

The machining conditions include pulse interval between voltage pulses repeatedly applied to the electrode gap between the wire electrode 12 and the workpiece W, the average voltage applied per unit time across the electrode gap, the relative movement speed between the wire electrode 12 and the workpiece W, the feed rate of the wire electrode 12, etc.

Of the above, the pulse interval is a pause time during which no voltage pulse is applied to the electrode gap between the workpiece W and the wire electrode 12. The relative movement speed between the wire electrode 12 and the workpiece W is a speed at which the wire electrode 12 is moved relative to the workpiece W. The feed rate is a speed at which the wire electrode 12 travels in a direction in which the wire electrode 12 extends.

When the voltage pulses are applied to the electrode gap between the workpiece W and the wire electrode 12, the electrical discharge machining unit 54 controls an unillustrated power unit in the machine main body 14, based on the average voltage per unit time, the pulse interval, etc., stored in the storage unit $50_{CON}$. Thus, the voltage pulse is repeatedly applied at a predetermined cycle to the electrode gap between the workpiece W and the wire electrode 12 from the power unit.

When the wire electrode 12 is moved relative to the workpiece W, the electrical discharge machining unit 54 controls a motor connected to an unillustrated table on which the workpiece W is fixed. This motor (not shown) moves the table on the XY plane. As a result, the relative positional relationship between the wire electrode 12 and the workpiece W changes, that is, the relative movement of the wire electrode 12 with respect to the workpiece W is implemented.

When adjusting the tilt of the wire electrode 12 with respect to the workpiece W, the electrical discharge machining unit 54 controls at least one of an unillustrated motor connected to the die guide 34 and an unillustrated motor connected to the die guide 36. The motor connected to the die guide 34 moves the die guide 34 on a plane parallel to the XY plane. Similarly, the motor connected to the die guide 36 moves the die guide 36 on a plane parallel to the XY plane. In this manner, the positions of the die guide 34 and the die guide 36 can be made different from each other with respect to at least one of the X-axis direction and the Y-axis direction. Thus, the wire electrode 12 can be tilted with respect to the workpiece W.

When the wire electrode 12 is moved in the running direction, the electrical discharge machining unit 54 controls the torque motor 42 by using the feed rate or the like stored in the storage unit $50_{CON}$. Thus, the torque motor 42 applies torque to the wire bobbin 24 and the feed roller 40, to thereby convey the wire electrode 12 that is in contact with the wire bobbin 24 and the feed roller 40, in the running direction. The running direction (Z-axis negative direction) of the wire electrode 12 and the direction of movement (X-axis direction, Y-axis direction) of the wire electrode 12 that is relatively moved with respect to the workpiece W intersect each other.

Now, the factors that can be considered concerning the machining accuracy in electrical discharge machining will be explained.

To begin with, the machining program 56 executed by the electrical discharge machining unit 54 in electrical discharge machining will be described in more detail. The machining program 56 has blocks 62 (FIG. 5) corresponding respectively to a plurality of partial paths (path segments) 60 (FIG. 6) into which the machining path 58 is divided. Each of the blocks 62 has path information indicating the corresponding partial path 60. The path information includes information indicating the end point of the corresponding partial path 60 and information indicating along what trajectory (i.e., path) the wire electrode 12 should be relatively moved toward the end point (i.e., indicating the shape of the partial path 60).

For example, in an arcuate partial path 60, the amount of discharge generated at the electrode gap becomes more unstable than in a linear partial path 60, so that the gap distance between the wire electrode 12 and the workpiece W is prone to be unstable. In order to deal with this, it is conceivable to cause the electrical discharge machining unit 54 to perform control such as to appropriately adjust the relative movement speed or the pause time when the wire electrode 12 moves along the arcuate partial path 60. That is, it is considered that the machining accuracy can be improved by changing (compensating) the machining conditions so that the machining conditions are optimized for the shape of the partial path 60 indicated by the path information.

However, a complicated machining path 58 has a shape composed of multiple partial paths 60, so that it may exhibit a geometry in which the gap distance between the wire electrode 12 and the workpiece W tends to be unstable. The geometry is, for example, an angular corner formed by two adjacent partial paths 60. If the two adjacent partial paths 60 forming an angular corner are both linear, the machining condition for straight lines is applied when referring to the path information on each of the partial paths. In this case, the electrical discharge machining unit 54 fails to cope with the situation in which the gap distance between the wire electrode 12 and the workpiece W becomes unstable, so that there is concern that the machining accuracy may be adversely affected. If it is necessary to finely change the advancing direction of the wire electrode 12 while forming angular corners, there is a risk of further affecting the machining accuracy. Thus, when a complicated machining path 58 is defined in the machining program 56, it is difficult to perform electrical discharge machining on the workpiece W with high accuracy.

To deal with, in the present embodiment, the program editing device 18 described below edits the machining program 56 so that the electrical discharge machining unit 54 can suitably adjust the machining conditions. Hereinafter, the configuration of the program editing device 18 of the present embodiment and the program editing process executed by the program editing device 18 will be described step by step.

Figure 3:
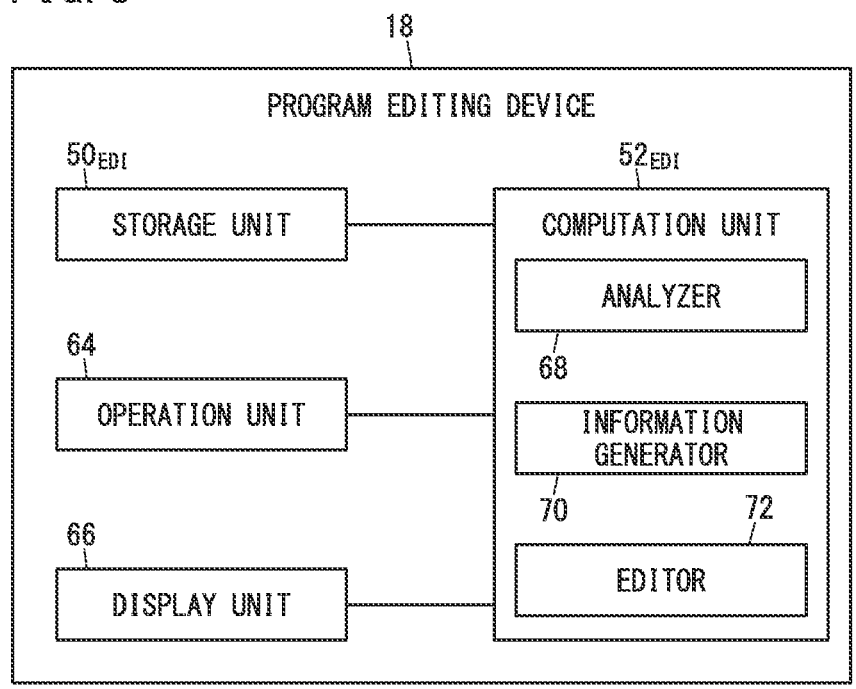
FIG. 3 is a schematic diagram showing a configuration of a program editing device.

FIG. 3 is a schematic diagram showing a configuration of the program editing device 18.

The program editing device 18 edits the machining program 56. The program editing device 18 includes a computation unit $52_{EDI}$, an operation unit 64, a display unit 66, and a storage unit $50_{EDI}$.

The computation unit $52_{EDI}$ processes information, and includes hardware such as a CPU or GPU, for example.

The operation unit 64 is used for inputting information, and includes, for example, a mouse, a keyboard, and a touch panel arranged on the display screen of the display unit 66. The display unit 66 displays information, and is for example, a liquid crystal display.

The storage unit $50_{EDI}$ stores information, and includes, for example, a hard disk. The storage unit $50_{EDI}$ stores editing software for executing a program editing process for editing the machining program 56.

The computation unit $52_{EDI}$ has an analyzer 68, an information generator 70, and an editor 72. Each of these units is realized by the computation unit $52_{EDI}$ executing the editing software.

The analyzer 68 reads the machining program 56 from the storage unit $50_{EDI}$ of the control device 16, and analyzes the read machining program 56. In the analysis, the analyzer 68 identifies predetermined shape patterns included in the machining path 58.

The analyzer 68 identifies predetermined shape patterns composed of a series of multiple partial paths 60 by recognizing the path information possessed by each of multiple blocks 62. In the present embodiment, the following two shape patterns correspond to predetermined shape patterns, though is not limited to these. That is, a first-type shape pattern is a "pattern that transitions from a straight line to a curved line or from a curved line to a straight line". A second-type shape pattern is a "pattern in which two partial paths 60 form an angular corner shape having a predetermined angle". The predetermined angle is not particularly limited, and may be defined as, for example, an angle included within a predetermined range.

The information generator 70 generates shape information 74 (FIG. 7) corresponding to an identified predetermined shape pattern. The shape information 74 contains information indicating a target shape pattern and information regarding partial paths 60 forming the shape pattern, in block 62 units. The number of blocks 62 included in the shape information 74 is not limited, but varies depending on the corresponding shape pattern in the present embodiment.

For example, the shape information 74 generated correspondingly to the first-type shape pattern includes, in the present embodiment, blocks 62 indicating information on partial paths 60 forming this first-type shape pattern, i.e., a block 62 indicating information on a partial path 60 located on the upstream side and another block 62 indicating information on a partial path 60 located on the downstream side.

The information indicating a partial path 60 is, for example, information indicating the shape of the partial path 60 or information indicating the path length. Further, when the partial path 60 is arc-shaped, information on the curvature of the arc may be included in the information indicating the partial path 60. The information on the curvature of the arc is, for example, the radius of curvature.

Further, similarly to the shape information 74 corresponding to the first-type shape pattern, the shape information 74 generated correspondingly to the second-type shape pattern includes a block 62 indicating information on a partial path 60 located on the upstream side and another block 62 indicating information on a partial path 60 located on the downstream side. The shape information 74 corresponding to the second-type shape pattern further includes yet another block 62 indicating information on the angular corner formed by the upstream-side partial path 60 and the downstream-side partial path 60.

The information on the angular corner is, for example, information indicating whether the corner is an outer corner or an inner corner, or information indicating the angle formed at the corner. Further, when the upstream side partial path 60 and the further upstream side partial path 60 form another angular corner, information on the other angular corner may be included.

The editor 72 edits the machining program 56 by inserting the shape information 74 generated by the information generator 70 into the machining program 56. Thus, in addition to the multiple pieces of path information indicating multiple partial paths 60, the shape information 74 relating to the predetermined shape pattern composed of the multiple partial paths 60 is also defined in the machining program 56.

The shape information 74 is inserted into the machining program 56 such that the electrical discharge machining unit 54 can grasp the content of the shape information 74 when the relative movement along the most upstream side partial path 60 among the multiple partial paths 60 that constitute the shape pattern indicated by the shape information 74 is performed. More preferably, the shape information 74 is inserted into the machining program 56 such that the electrical discharge machining unit 54 can grasp the content of the shape information 74 immediately before the relative movement along the most upstream side partial path 60 is performed.

The above is one example of the configuration of the program editing device 18 for editing the machining program 56. The edited machining program 56 is stored in the storage unit $50_{EDI}$, and is output to the storage unit $50_{CON}$ of the control device 16 as necessary. Thus, the wire electrical discharge machine 10 can perform electrical discharge machining based on the edited machining program 56.

Figure 4:
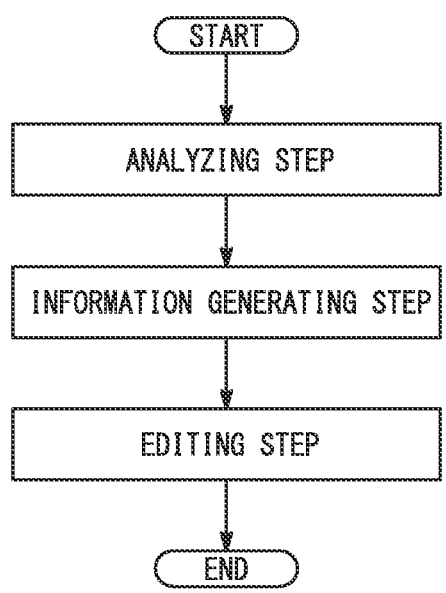
FIG. 4 is a flowchart showing an example of the flow of a program editing process.

FIG. 4 is a flowchart showing one example of a processing flow of the program editing process. FIG. 5 is a diagram showing an example of a state of the machining program 56 before editing. Note that, in FIG. 5, a part of the machining program 56 is omitted. FIG. 6 is a diagram showing a machining path 58 defined by the machining program 56 of FIG. 5. Note that, in FIG. 6, a part of the machining path 58 is omitted.

Next, the flow of the program editing process by the program editing device 18 will be described. The program editing process includes an analyzing step, an information generating step, and an editing step, as shown in FIG. 4. Hereinafter, each of these steps will be described sequentially concerning an example of editing the machining program 56 shown in FIG. 5.

At the analyzing step, a predetermined shape pattern is identified by analyzing the machining program 56. The analyzer 68 can analyze the machining program 56 and identify a predetermined shape pattern. Next, the identification of a predetermined shape pattern will be described with examples.

The machining path 58 illustrated in FIG. 6 has a series of multiple partial paths 60 (60A, 60B, 60C, 60D). The machining program 56 in FIG. 5 corresponding to this machining path 58 includes a plurality of blocks 62 (62A, 62B, 62C, 62D). Of these, the block 62A corresponds to the partial path 60A, and has path information indicating the partial path 60A. Similarly, the block 62B has path information indicating the partial path 60B, the block 62C has path information indicating the partial path 60C, and the block 62D has path information indicating the partial path 60D.

Here, in the example of FIG. 6, the partial path 60A has a linear shape, and the partial path 60B has a convex arc shape. Further, the partial path 60A and the partial path 60B are connected in this order. In this case, the analyzer 68 analyzes the machining program 56 and thereby identifies the pattern (first-type shape pattern) transitioning from a straight line to a curved line as being formed by the upstream side partial path 60A and the downstream side partial path 60B.

Further, in the example of FIG. 6, the partial path 60B and the partial path 60C form an angular corner having a predetermined angle (115 degrees). In this case, the analyzer 68 analyzes the machining program 56 and thereby identifies the pattern (second-type shape pattern) forming the angular corner having the predetermined angle, as being formed by the upstream side partial path 60B and the downstream side partial path 60C.

In this way, the analyzing step identifies all predetermined shape patterns included in the machining path 58.

At the information generating step, shape information 74 corresponding to the identified predetermined shape pattern is generated based on the result of the analysis obtained at the analyzing step. The shape information 74 may be generated by the information generator 70. Hereinafter, the generation of the shape information 74 will be described by giving examples.

As an instance, for the first-type shape pattern composed of the partial path 60A and the partial path 60B, the information generator 70 generates shape information 74A indicating that the partial path 60A and the partial path 60B are connected in series. The shape information 74A may include information on the path length of each of the partial path 60A and the partial path 60B. Further, for the arc-shaped partial path 60B, information on the curvature of the arc may be also included.

Figure 7A:
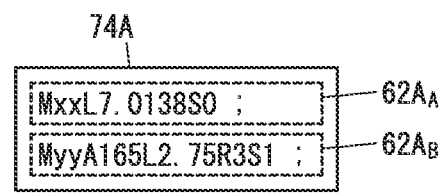
FIG. 7A is a first example of shape information.

FIG. 7A is a first example of shape information 74. Note that FIG. 7A shows an example of shape information 74A.

FIG. 7A shows an example of shape information 74A. The shape information 74A has two blocks 62, i.e., a block $62A_A$ indicating information on the upstream side partial path 60A and a block $62A_B$ indicating information on the downstream side partial path 60B.

Of the information shown in each of the block $62A_A$ and the block $62A_B$, the two letters on the right side of "M" denote the sequential order in the machining path 58. "Mxx" indicates that the block $62A_A$ containing it relates to the upstream side partial path 60. Further, "Myy" indicates that the block $62A_B$ containing it relates to the downstream side partial path 60. In addition, though not shown in FIG. 7A, "Mww" in FIG. 7C, which will be described later, indicates that a block containing it is upstream of the block with "Mxx", and "Mzz" indicates that a block containing it is downstream of the block with "Myy". The number on the right side of "L" indicates the path length of the partial path 60, the number on the right side of "R" indicates the value of the radius of curvature, and the number on the right side of "A" indicates the inclination angle with respect to the partial path 60 positioned just anteriorly. Then, regarding the information indicated by the block 62 included in the shape information 74, the number on the right side of "S" indicates the shape type of the partial path 60. In the present embodiment, it is assumed, for example, that "S0 is a straight line", "S1 is a convex arc", "S2 is a concave arc", "S3 is an outer corner (convex angle corner)", and "S4 is an inner corner (concave angle corner)".

Based on the above, it is understood that the shape information 74A indicates that the upstream side partial path 60A is a straight line having a path length of "7.0138". The shape information 74A further indicates that the downstream side partial path 60B forms an inclination angle of "165" relative to the previous partial path 60A, and is a "convex arc" having a path length of "2.75" and a radius of curvature of "3".

Referring to another example, for a second-type shape pattern composed of the partial path 60B and the partial path 60C, the information generator 70 generates shape information 74B indicating an angular corner shape formed by the partial path 60B and the partial path 60C. The shape information 74B includes an angle formed between the partial path 60B and the partial path 60C. The shape information 74B may further include, for each of the partial path 60B and the partial path 60C, information indicating the path length and information indicating the curvature of the arc.

Figure 7B:
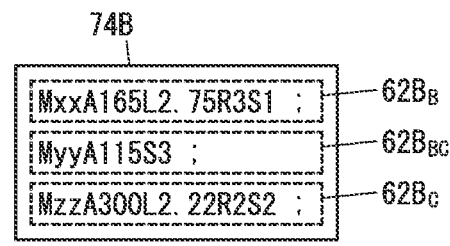
FIG. 7B is a second example of shape information.

FIG. 7B is a second example of shape information 74. Note that FIG. 7B shows an example of shape information 74B.

FIG. 7B shows an example of shape information 74B. The shape information 74B has two blocks 62, i.e., a block $62B_B$ indicating information on the upstream side partial path 60B and a block $62B_c$ indicating information on the downstream side partial path 60C. Further, the shape information 74B further has a block $62B_{BC}$ indicating information on the angular corner formed between the partial path 60B and the partial path 60C.

Figure 7C:
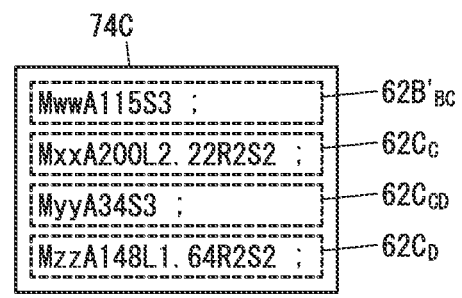
FIG. 7C is a third example of shape information.

FIG. 7C is a third example of shape information 74. Note that FIG. 7C shows an example of shape information 74C.

FIG. 7C shows an example of shape information 74C. The shape information 74C has a block $62C_c$ indicating information on the upstream side partial path 60C, a block $62C_D$ indicating information on the downstream side partial path 60D, and a block $62C_{CD}$ indicating information on the angular corner formed between the partial path 60C and the partial path 60D.

Further, as shown in FIG. 7C, the shape information 74C further has a block $62B'_{BC}$ indicating information regarding the corner formed by the partial path 60C and the partial path 60B. In this way, when the upstream side partial path 60 (60C) forms an angular corner jointly with the further upstream side partial path 60 (60B), the shape information 74 (74C) can include the information as to the angular corner.

In this way, in the information generating step, the associated shape information 74 (74A, 74B, 74C, 74D) is generated for all the identified predetermined shape patterns.

In the editing step, the machining program 56 is edited by inserting shape information 74 generated in the information generating step into the machining program 56. Each piece of shape information 74 is inserted so as to accompany the path information corresponding to the upstream side partial path 60 of the multiple partial paths 60 with which the shape information 74 is associated. Next, editing of the machining program 56 will be described with examples.

Figure 8:
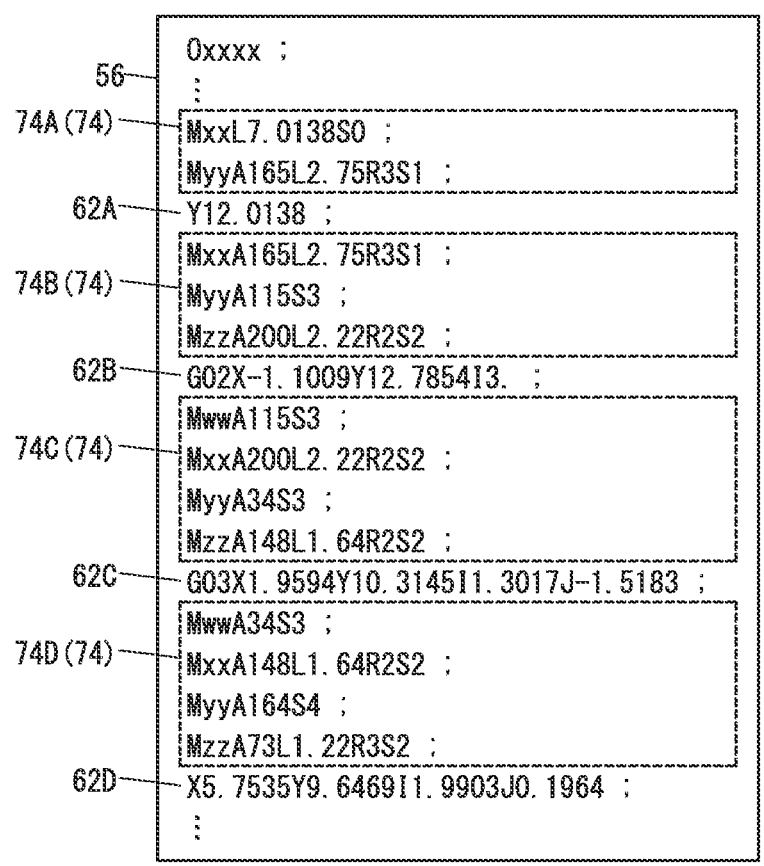
FIG. 8 is a diagram showing a state of the machining program of FIG. 5 after editing.

FIG. 8 is a diagram showing an edited state of the machining program 56 of FIG. 5. In FIG. 8, a part of the machining program 56 is omitted.

For example, the partial paths 60 corresponding to the shape information 74A are the partial path 60A and the partial path 60B. Of these, the partial path 60A is on the upstream side. Therefore, the editor 72 inserts the shape information 74A into the machining program 56 so as to accompany the path information (block 62A) corresponding to the partial path 60A.

Similarly, the editor 72 inserts the shape information 74B into the machining program 56 so as to accompany the path information (block 62B) corresponding to the partial path 60B. Further, the editor 72 inserts the shape information 74C into the machining program 56 so as to accompany the path information (block 62C) corresponding to the partial path 60C.

In this way, in the editing step, all pieces of generated shape information 74 are inserted to edit the machining program 56.

The machining program 56 after editing is stored in the storage unit $50_{CON}$ of the control device 16, so that the electrical discharge machining unit 54 can execute it. When performing electrical discharge machining on the workpiece W, the electrical discharge machining unit 54 moves the wire electrode 12 relative to the workpiece W, based on the edited machining program 56.

Here, the electrical discharge machining unit 54, based on the shape information 74A, for example, can recognize that the transition from the partial path 60A to the partial path 60B is a transition from a straight line to a curved line. Therefore, the electrical discharge machining unit 54 can smoothly change the machining conditions from those suitable for linear relative movement of the wire electrode 12 to those suitable for curved relative movement thereof.

Further, the electrical discharge machining unit 54, based on the shape information 74B, for example, can recognize that the transition from the partial path 60B to the partial path 60C is accompanied with formation of an angular corner having a predetermined angle. Therefore, the electrical discharge machining unit 54 can smoothly change the machining conditions from those suitable for the electrical discharging machining along the partial path 60B to those suitable for forming the angular corner. The electrical discharge machining unit 54 can also smoothly change the machining conditions from those suitable for forming the angular corner to those suitable for electrical discharge machining along the partial path 60C.

When no machining program editing process of the present embodiment is applied and when, for example, a certain partial path 60 has a short path length, there is concern that optimization of the machining conditions is too late for machining by the wire electrode along the partial path 60. When the present embodiment is applied to this case, each of the path lengths of the partial paths 60 constituting the predetermined shape pattern can be included in the shape information 74. Therefore, the electrical discharge machining unit 54 can recognize in advance the presence of a partial path 60 having a short path length, and hence can optimize the timing for adjusting the machining conditions.

Though the present embodiment has been described taking an example where the control device 16 and the program editing device 18 are separate from each other, the control device 16 and the program editing device 18 may be integrally configured. That is, the editing software may be stored in the storage unit $50_{CON}$, and the computation unit $52_{CON}$ may execute the above machining program editing process in cooperation with the storage unit $50_{CON}$.

Thus, according to the present embodiment, the program editing device 18 and the wire electrical discharge machine 10 capable of improving the accuracy of electrical discharge machining are provided.

Modification

Though the embodiment has been described as an example of the present invention, it goes without saying that various modifications and improvements can be added to the above embodiment. It is clear from the description of the claims that those added with such modifications and improvements should be incorporated in the technical scope of the present invention.

Modification 1

Figure 9:
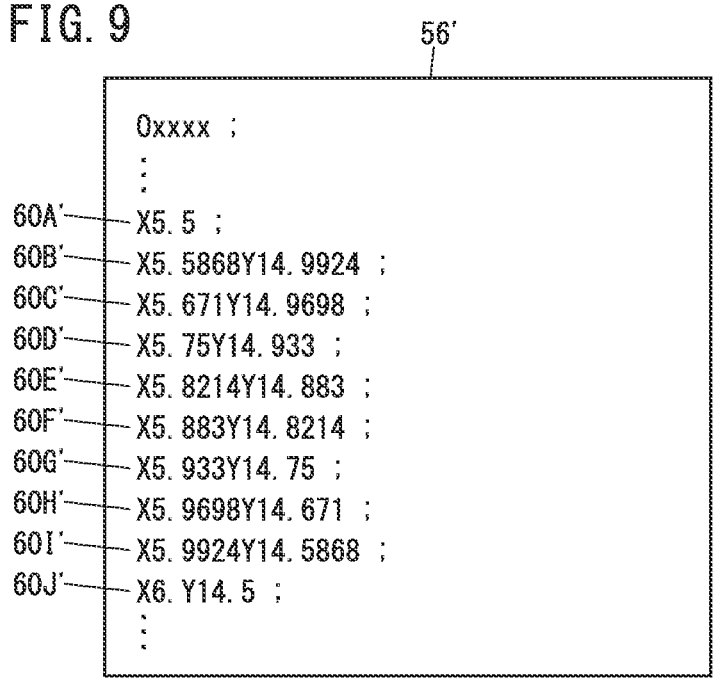
FIG. 9 is a diagram showing an example of a state of a machining program of a modification 1 before editing.
Figure 10:
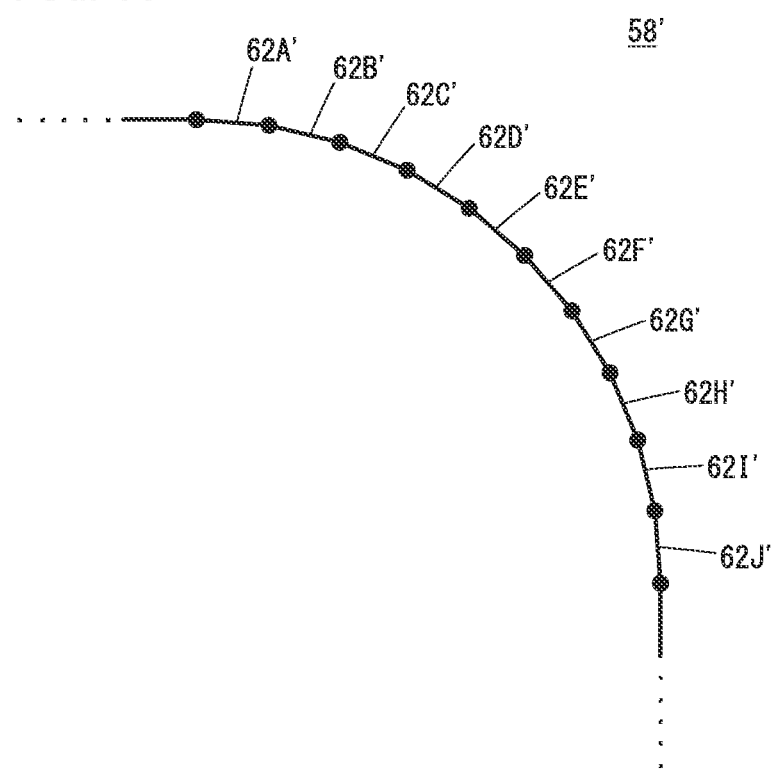
FIG. 10 is a diagram showing a machining path defined by the machining program of FIG. 9.

FIG. 9 is a diagram showing an example of a state of a machining program 56' of a modification 1 before editing. Note that a part of the machining program 56' is omitted in FIG. 9. FIG. 10 is a diagram showing a machining path 58' defined by the machining program 56' of FIG. 9. In FIG. 10, a part of the machining path 58' is omitted.

As described in the embodiment, predetermined shape patterns are not limited to the two types described in the embodiment. In this modification, one example will be described.

In the machining path 58', as shown in FIG. 10, a pseudo-curve shape is formed by a series of multiple linear partial paths 60' (60A', 60B', . . . , 60P). The analyzer 68 may identify the pseudo-curve shape as a predetermined shape pattern.

When the pseudo-curve shape is identified as a predetermined shape pattern, the information generator 70 can generate shape information 74' (74A', 74B', . . . , 74J') according to the pseudo-curve shape. Here, in this modification, the generated shape information 74' is configured to include information indicating a curve shape that approximates to the pseudo-curve shape.

Figure 11:
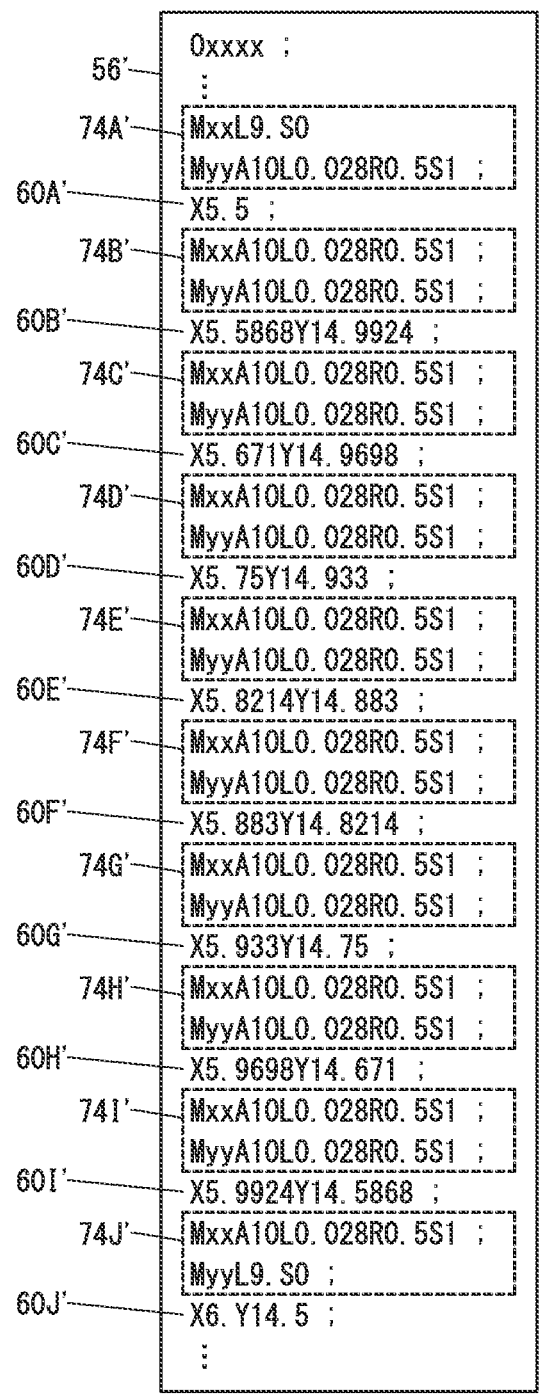
FIG. 11 is a diagram showing a state of the machining program of FIG. 9 after editing.

FIG. 11 is a diagram showing an edited state of the machining program 56' of FIG. 9. Note that a part of the machining program 56' is omitted in FIG. 11.

FIG. 11 shows an example of shape information 74' that can be generated by the information generator 70 in this modification. The shape information 74' includes information (L0.028) indicating the path length of the partial path 60 constituting part of the pseudo-curve shape, and also includes information (R0.5) indicating the curvature of the curve that approximates to the pseudo-curve. Further, each of the plurality of partial paths 60 forming the pseudo-curve shape is linear in itself, but as the information indicating the shape pattern type, the information (S1) indicating an convex arc is included in the shape information 74'.

The editor 72 inserts the shape information 74' generated by the information generator 70 into the machining program 56', as information accompanying all the path information corresponding to the plurality of partial paths 60' that constitute the pseudo curve. As a result, the electrical discharge machining unit 54 executing the edited machining program 56' can perform electrical discharge machining by applying the machining conditions for a curved path when the wire electrode 12 advances along the pseudo-curve indicated by the shape information 74'. Thus, machining accuracy can be improved.

Modification 2

The above embodiment and modifications may be arbitrarily combined as long as no inconsistency occurs.

Inventions that can be Obtained from the Embodiment

The inventions that can be grasped from the above-described embodiment and the modifications thereof will be described below.

First Invention

The first invention resides in a program editing device (18) for editing a machining program (56) in which a machining path (58) along which a wire electrode (12) of a wire electrical discharge machine (10) machines a workpiece (W) is defined. The machining program (56) includes a plurality of blocks (62) corresponding to respective multiple partial paths (60) into which the machining path (58) is divided, each of the blocks (62) including path information indicating the corresponding partial path (60). The program editing device (18) includes: an analyzer (68) configured to analyze the machining program (56) and thereby identify a predetermined shape pattern formed by a series of the multiple partial paths (60) in the machining path (58); an information generator (70) configured to generate shape information (74) corresponding to the identified predetermined shape pattern; and an editor (72) configured to insert the shape information (74) into the machining program (56).

With the above configuration, it is possible to provide a program editing device (18) that can achieve improved accuracy in electrical discharge machining.

The shape information may include information indicating a shape of each of the multiple partial paths (60) forming the predetermined shape pattern. This can improve machining accuracy.

The shape information (74, 74') may include at least one of information indicating the path length and information indicating the curvature, of the partial path (60) of the predetermined shape pattern. This can improve machining accuracy.

The predetermined shape pattern may include an angular corner shape formed by two adjacent partial paths (60) of the multiple partial paths, and the shape information (74) corresponding to the angular corner shape may include information indicating the angle formed by the two adjacent partial paths (60) forming the angular corner shape. This can improve machining accuracy.

The predetermined shape pattern may include a pseudo-curve shape formed of a series of straight linear paths. The shape information (74') corresponding to the pseudo-curve shape may include information indicating a curve shape that approximates to the pseudo-curve shape. This can improve machining accuracy.

Second Invention

A wire electrical discharge machine (10) which includes a wire electrode (12) and is configured to move the wire electrode (12) relative to a workpiece (W) along a machining path (58) defined in a machining program (56), includes: a program editing device (18) described in the above <First Invention>, and an electrical discharge machining unit (54) configured to move the wire electrode (12) relative to the workpiece (W), along the machining path (58) defined in the machining program (56) edited by the program editing device (18) and perform electrical discharge machining on the workpiece (W) while compensating the machining conditions based on the shape information (74, 74') inserted in the machining program (56).

With the above configuration, it is possible to provide a wire electrical discharge machine (10) that can achieve improved accuracy in electrical discharge machining.

What is claimed is:

1. A program editing device for editing a machining program in which a machining path along which a wire electrode of a wire electrical discharge machine machines a workpiece is defined,
wherein the machining program includes a plurality of blocks corresponding to respective multiple partial paths into which the machining path is divided, each of the blocks including path information indicating the corresponding partial path,
the program editing device, comprising:
an analyzer configured to analyze the machining program and thereby identify a series of the multiple partial paths in a manner so that the series of the multiple partial paths form a predetermined shape pattern in the machining path;
an information generator configured to generate shape information indicating the identified predetermined shape pattern formed by the partial paths; and
an editor configured to insert the shape information into the machining program.

2. The program editing device according to claim 1, wherein the shape information is configured to include information indicating a shape of each of the multiple partial paths forming the predetermined shape pattern.

3. The program editing device according to claim 2, wherein the shape information is configured to include at least one of information indicating a path length and information indicating a curvature, of the partial path of the predetermined shape pattern.

4. The program editing device according to claim 1, wherein:
the predetermined shape pattern includes an angular corner shape formed by two adjacent partial paths of the multiple partial paths; and
the shape information corresponding to the angular corner shape includes information indicating an angle formed by the two adjacent partial paths forming the angular corner shape.

5. The wire electrical discharge machine configured to move the wire electrode relative to the workpiece along the machining path defined in the machining program, the wire electrical discharge machine comprising:
a program editing device according to claim 1; and
an electrical discharge machining unit configured to move the wire electrode relative to the workpiece, along the machining path defined in the machining program edited by the program editing device and perform electrical discharge machining on the workpiece while compensating machining conditions based on the shape information inserted into the machining program.

6. A program editing device for editing a machining program in which a machining path along which a wire electrode of a wire electrical discharge machine machines a workpiece is defined,
wherein the machining program includes a plurality of blocks corresponding to respective multiple partial paths into which the machining path is divided, each of the blocks including path information indicating the corresponding partial path,
the program editing device, comprising:
an analyzer configured to analyze the machining program and thereby identify a predetermined shape pattern formed by a series of the multiple partial paths in the machining path;
an information generator configured to generate shape information corresponding to the identified predetermined shape pattern; and
an editor configured to insert the shape information into the machining program wherein:
the predetermined shape pattern includes a pseudo-curve shape formed of a series of straight linear paths; and
the shape information corresponding to the pseudo-curve shape includes information indicating a curve shape that approximates to the pseudo-curve shape.

* * * * *